US012736693B2

(12) United States Patent
Gavin et al.

(10) Patent No.: US 12,736,693 B2
(45) Date of Patent: Sep. 15, 2026

(54) AUTOMATED PASSIVE ACOUSTIC MONITORING WITH MACHINE LEARNING

(71) Applicant: BLUEiQ LLC, Harvard, MA (US)

(72) Inventors: Kimberly E Gavin, Harvard, MA (US); Robert Joseph McGurrin, Arlington, MA (US)

(73) Assignee: BLUEIQ LLC, Harvard, MA (US)

( * ) Notice: Subject to any disclaimer, the term of this patent is extended or adjusted under 35 U.S.C. 154(b) by 63 days.

(21) Appl. No.: 18/743,598

(22) Filed: Jun. 14, 2024

(65) Prior Publication Data

US 2024/0418881 A1 Dec. 19, 2024

Related U.S. Application Data

(60) Provisional application No. 63/658,937, filed on Jun. 12, 2024, provisional application No. 63/651,786, (Continued)

(51) Int. Cl.
*G01V 1/00* (2024.01)
*G01V 1/18* (2006.01)
(Continued)

(52) U.S. Cl.
CPC .............. *G01V 1/001* (2013.01); *G01V 1/188* (2013.01); *G01V 1/201* (2013.01); *G06N 3/0455* (2023.01);
(Continued)

(58) Field of Classification Search
CPC ........ G01V 1/001; G01V 1/188; G01V 1/201; G01V 2001/207; G06N 20/20; G06N 3/0455
(Continued)

(56) References Cited

U.S. PATENT DOCUMENTS 7,330,399 B2 2/2008 Lerro et al.
9,651,649 B1 * 5/2017 Salloum ................ G01S 3/8083
(Continued)

OTHER PUBLICATIONS

Williams et al. ("Enhancing automated analysis of marine soundscapes using ecoacoustic indices and machine learning." Ecological Indicators 140 (2022): 108986., "Williams") (Year: 2022).*
(Continued)

*Primary Examiner* — Yuqing Xiao
*Assistant Examiner* — Christopher Richard Walker
(74) *Attorney, Agent, or Firm* — Adams Intellex, PLC

(57) ABSTRACT

Disclosed embodiments provide techniques for automated passive acoustic monitoring with machine learning. An acoustic sensor is accessed. The acoustic sensor includes an embedded acoustic controller which hosts a machine learning model. The acoustic sensor is coupled to one or more hydrophones. The acoustic sensor is deployed in a body of water and is submerged. The acoustic sensor can enter a sleep mode. The hydrophones receive an underwater audio signal. The audio signal can be associated with an acoustic pressure. The acoustic sensor can be woken from sleep when the acoustic pressure is above a pressure threshold. The machine learning model classifies a predicted source of the underwater audio signal. The classifying can be based on filtering the underwater audio signal for a first frequency band associated with a source of interest. The predicted source is reported to a user using a communications device.

26 Claims, 8 Drawing Sheets

Related U.S. Application Data filed on May 24, 2024, provisional application No. 63/573,161, filed on Apr. 2, 2024, provisional application No. 63/521,361, filed on Jun. 16, 2023.

(51) Int. Cl.
*G01V 1/20* (2006.01)
*G06N 3/0455* (2023.01)
*G06N 20/20* (2019.01)

(52) U.S. Cl.
CPC ....... *G06N 20/20* (2019.01); *G01V 2001/207* (2013.01)

(58) Field of Classification Search
USPC .......................................................... 367/118
See application file for complete search history.

(56) References Cited

U.S. PATENT DOCUMENTS

| | | | | |
|---|---|---|---|---|
| 10,534,099 | B2 | 1/2020 | Tenghamn | |
| 10,953,440 | B2 | 3/2021 | Okada et al. | |
| 11,119,211 | B2 | 9/2021 | Steenstrup et al. | |
| 11,790,936 | B1 * | 10/2023 | O'Hara | G10L 25/78 367/21 |
| 11,808,570 | B2 * | 11/2023 | Beatty | G01C 13/002 |
| 11,857,373 | B2 | 1/2024 | Grundfest et al. | |
| 2023/0132220 | A1 | 4/2023 | Vizas et al. | |
| 2023/0288587 | A1 | 9/2023 | Moldoveanu | |
| 2023/0313676 | A1 | 10/2023 | Wang et al. | |
| 2024/0069194 | A1 | 2/2024 | Steenstrup et al. | |
| 2024/0118076 | A1 | 4/2024 | Carrier et al. | |
| 2024/0168187 | A1 | 5/2024 | Ozdemir et al. | |

OTHER PUBLICATIONS

Gillespie et al. ("Passive acoustic methods for tracking the 3D movements of small cetaceans around marine structures." PLoS One 15.5 (2020): e0229058., "Gillespie") (Year: 2020).*

Trawicki ("Multispecies discrimination of whales (cetaceans) using Hidden Markov Models (HMMS)." Ecological Informatics 61 (2021): 101223., "Trawicki") (Year: 2021).*

Bittle et al. ("A review of current marine mammal detection and classification algorithms for use in automated passive acoustic monitoring." Proceedings of Acoustics. vol. 2013. Victor Harbor, SA: Australian Acoustical Society, 2013., "Bittle") (Year: 2013).*

Ibrahim et al. "A new approach for north atlantic right whale upcall detection." 2016 international symposium on computer, consumer and control (IS3C). IEEE, 2016., "Ibrahim") (Year: 2016).*

Toma et al. ("Smart embedded passive acoustic devices for real-time hydroacoustic surveys." Measurement 125 (2018): 592-605., "Toma") (Year: 2018).*

Premus et al. ("A wave glider-based, towed hydrophone array system for autonomous, real-time, passive acoustic marine mammal monitoring." The Journal of the Acoustical Society of America 152.3 (2022): 1814-1828., "Premus") (Year: 2022).*

Lowenhar et al. ("Power Over Ethernet Daisy Chained Acoustic Emission System for Structure Health Monitoring." World Conference on Acoustic Emission. Cham: Springer International Publishing, 2017., "Lowenhar") (Year: 2017).*

Bannoura et al. ("Acoustic wake-up receivers for home automation control applications." Electronics 5.1 (2016): 4., "Bannoura") (Year: 2016).*

Baumgartner et al. "Persistent near real-time passive acoustic monitoring for baleen whales from a moored buoy: System description and evaluation." Methods in Ecology and Evolution 10.9 (2019): 1476-1489., "Baumgartner") (Year: 2019).*

* cited by examiner

AUTOMATED PASSIVE ACOUSTIC MONITORING WITH MACHINE LEARNING

RELATED APPLICATIONS

This application claims the benefit of U.S. provisional patent applications "Automated Passive Acoustic Monitoring With Machine Learning" Ser. No. 63/521,361, filed Jun. 16, 2023, "Hydrophone Data Over Internet Protocol With Machine Learning" Ser. No. 63/573,161, filed Apr. 2, 2024, "Software-Defined Acoustic Sensor Functions With Machine Learning" Ser. No. 63/651,786, filed May 24, 2024, and "Self-Arranging Acoustic Glider Array With Machine Learning" Ser. No. 63/658,937, filed Jun. 12, 2024.

Each of the foregoing applications is hereby incorporated by reference in its entirety.

FIELD OF ART

This application relates generally to monitoring acoustic data and more particularly to automated passive acoustic monitoring with machine learning.

BACKGROUND

Perhaps the least known part of the natural world is also the largest—the oceans that make up over 70 percent of the surface of the Earth. While scientists have divided the ocean into distinct regions, there is in fact one global ocean made up of over 326 million cubic miles of salt water. Well over 90 percent of all water on earth is found in the ocean. As a result, the ocean has a significant impact on weather, temperature, and the food supply of every living being on the planet. Even with this substantial influence on our lives, we know little about the ocean. More than 80 percent of the ocean has never been mapped, explored, or even seen by humans. By comparison, we know more about the surface of the moon and the planet Mars than we do about the Earth's ocean floor. We do know that there are deep trenches in the Pacific region, and at least two of them are deeper than Mount Everest is high. We know that the Atlantic region is shallow because of continental shelves that extend far out into the ocean depths. We know that the ocean floor is replete with thousands of species of plant life, and that marine animal life is comprised of many thousands, if not millions more species. We know that the water itself contains currents and subtle layers of varying salinity, temperature, and mineral composition. We know that sound traveling through the water can carry for many miles and that many species of marine life use their sense of sound to navigate and interpret their environment.

Our methods of ocean exploration are still in their infancy. There are only a few known submarines capable of diving deeper than 4,000 meters. And a small number of deep-sea submersibles can reach 11,000 meters, the depth of the lowest point of the *Mariana* Trench. At such depths, the temperature is between 1 and 4 degrees Celsius, no light from the surface is present, and the pressure per square inch is 15,750 pounds, more than 1,000 times what we humans experience on a daily basis. And yet life exists in this unexplored region of our planet. Plankton, sea cucumbers, shrimp, crabs, and other unusual life-forms have been found, many near a series of undersea mud volcanoes and hydrothermal vents.

Ocean depths are only one of many challenges to our understanding of the seas. Thick ice at either pole renders another set of problems to solve. Navigation under the ice can be perilous, with limited means of repair or rescue should problems arise. Shifting ice, extreme temperatures, variable salinity, and changes in current can make mapping and other experimentation more complicated. Operating under the ice for prolonged periods of time requires extensive training and equipment designed to function reliably under adverse conditions. And yet, as in the extreme ocean depths, life has been discovered in these formidable polar regions. Sponges, corals, plants, fish, water fleas, and mollusks have all been found not just surviving, but thriving. Even with all this, scientists believe that well over 90 percent of the marine life sharing this world with us remains to be discovered by humans. For us, the human adventure of exploring and discovering the vast ocean is truly just beginning.

SUMMARY

Underwater oceanic audio signal processing has been useful for understanding marine life, tracking vessels, and expanding our knowledge of the ocean. Passive acoustic monitoring, which entails the use of underwater microphones, called hydrophones, to collect sound data is an effective method of monitoring the oceanic environment. The hydrophones can be coupled to an acoustic sensor which can process underwater audio signals received by the hydrophones. One or more hydrophones can be coupled to an acoustic sensor. Audio captured by the hydrophones can be filtered, processed, and used by a machine learning model to reveal important information about the source of the audio signal. For example, a source of the audio signal can be determined. When trained appropriately, the machine learning model can provide information not previously obtainable. For example, the machine learning model can determine that an underwater audio signal is from a mammal, a species of mammal, or even a specific animal with the species. Likewise, the machine learning model can determine that an underwater audio source is from a vessel, an underwater vessel, or even a specific vessel. An acoustic embedded controller within the acoustic sensor can host a machine learning model, enabling powerful ML capabilities at extremely low power for underwater applications. Signal processing of this type, while challenging, can aid in protecting marine life, securing natural and manmade under water structures, detecting harmful activity such as illegal fishing operations, and studying and preserving marine environments.

Monitoring and classification of acoustic data is enabled by machine learning. An acoustic sensor is accessed. The acoustic sensor includes an embedded acoustic controller which hosts a machine learning model. The acoustic sensor is coupled to one or more hydrophones. The acoustic sensor is deployed in a body of water and is submerged. The acoustic sensor can enter a sleep mode. The hydrophones receive an underwater audio signal. The audio signal can be associated with an acoustic pressure. The acoustic sensor can be woken from sleep when the acoustic pressure is above a pressure threshold. The machine learning model classifies a predicted source of the underwater audio signal. The classifying can be based on filtering the underwater audio signal for a first frequency band associated with a source of interest. The predicted source is reported to a user using a communications device.

Disclosed embodiments provide a computer-implemented method for monitoring acoustic data comprising: accessing an acoustic sensor, wherein the acoustic sensor includes an embedded acoustic controller, wherein the embedded acoustic controller hosts a machine learning model, and wherein the acoustic sensor is coupled to one or more hydrophones; deploying, in a body of water, the acoustic sensor, wherein the acoustic sensor is submerged; receiving, by the one or more hydrophones, an underwater audio signal; classifying, by the machine learning model, a predicted source of the underwater audio signal; and reporting, to a user by the acoustic sensor, the predicted source of the underwater audio signal, wherein the reporting is accomplished using a communications device. In other embodiments, the predicted source identifies a species of marine mammal. In further embodiments, the classifying is accomplished using one or more feature vectors, wherein the one or more feature vectors are created by the machine learning model, and wherein the one or more feature vectors are based on the underwater audio signal. In embodiments, the classifying includes transforming the one or more feature vectors, wherein the transforming is based on Mel-Frequency Cepstral Coefficients (MFCCs). In embodiments, the classifying includes transforming one or more feature vectors, wherein the transforming is based on a Fast Fourier Transform (FFT). In embodiments, the classifying includes transforming one or more feature vectors, wherein the transforming is based on a wavelet transform.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
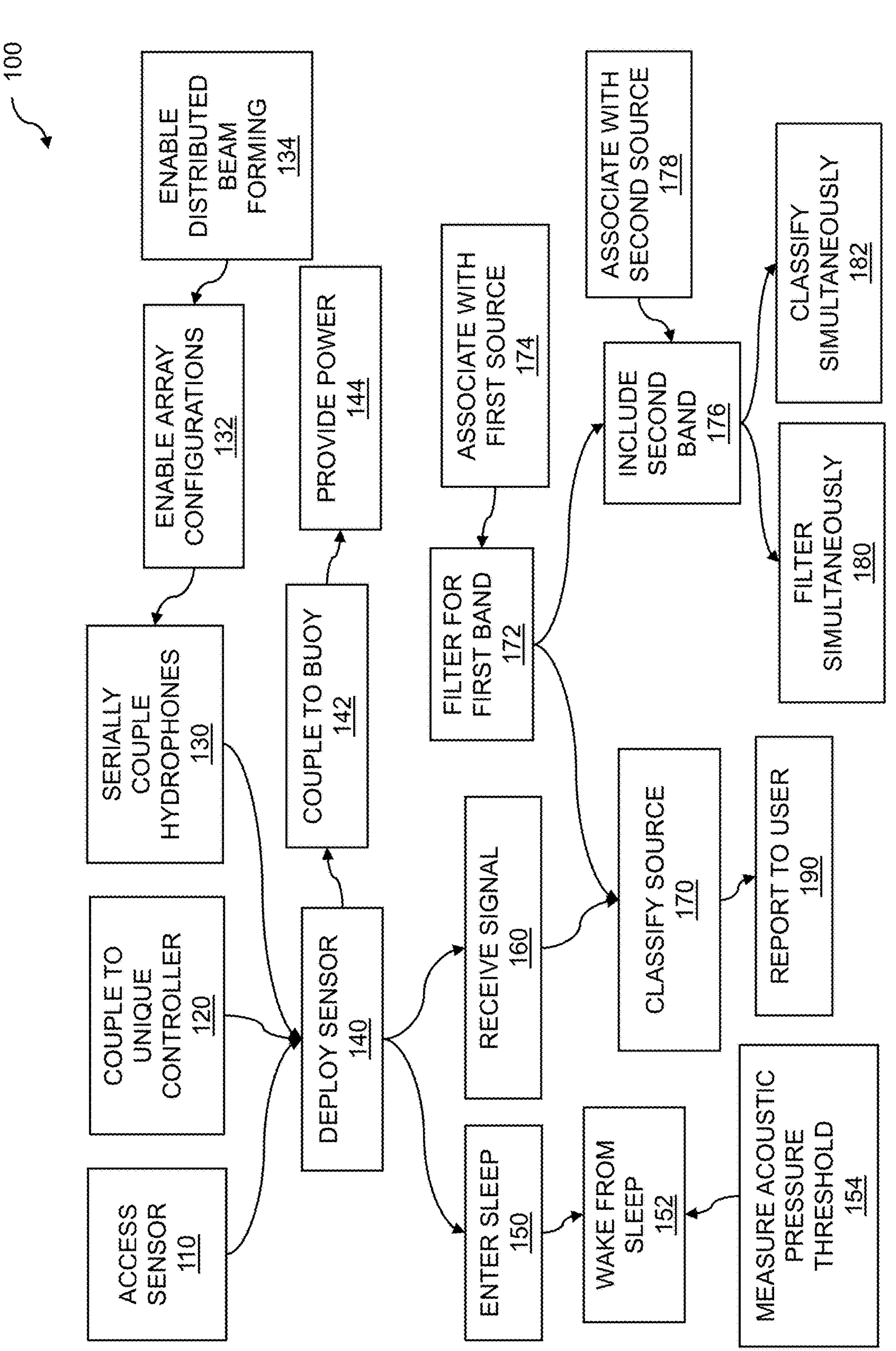
FIG. 1 is a flow diagram for automated passive acoustic monitoring with machine learning.

As the world becomes more connected and industrialized, protecting marine life can be a challenge. For example, sounds from oceanic shipping vessels can interfere with whales' ability to communicate and can interfere with their navigation. Further, their habitat and migration routes can be in close proximity to shipping ports. These factors can make it difficult to avoid whale strikes, especially because an early visual sighting of an aquatic animal is often not possible. Illegal fishing activity is another challenge to protecting marine life. These activities can take place in protected waters, use prohibited equipment, target a prohibited species, and so on. It can be difficult to monitor and stop these activities, especially in international waters. Yet another challenge to protecting marine life is understanding changes in response to rising water temperatures. As the earth's climate shifts, marine life is affected in terms of habitat, migration patterns, and so on. A certain number of animals, for example sharks, have been tagged, enabling tracking and observance of new travel patterns. But much more can be done to understand a wide variety of impacts to aquatic life, particularly in aquatic mammals.

All of these challenges can be better understood by analyzing emitted underwater audio signals. Unfortunately, these signals have proven difficult to analyze. First, underwater audio is often a combination of naturally occurring underwater sounds from marine life, manmade sounds (for example, pleasure boats or legal fishing operations), and above-water sounds such as rain hitting the surface of the water. The transmission properties of water present multiple additional challenges. For example, underwater sound propagation properties can depend on depth and water temperature, especially at the thermocline. Changes in density (for example, from bubbles) can contribute to audio distortion. Water is known to scatter sound waves, manipulating the frequency content of sound waves in a nonlinear fashion. In sum, these phenomena present a daunting challenge to accurate filtering, analysis, identification, and tracking of underwater audio sources.

The application of machine learning to signal analysis has created a new ability to classify sources across a wide spectrum of applications. However, these algorithms often rely on power-intensive processors which are not feasible to implement hundreds or even thousands of feet under the ocean. Passive underwater hydrophones and acoustic sensors can be tethered to a deep-water buoy, but these buoys typically provide limited power for the processing equipment needed to analyze these captured audio signals. Power must also be used to transmit data above the water to a vessel or satellite. Thus, maintaining deep ocean sensor classification operations can be a particularly difficult problem for complex audio sensor and analysis equipment. To address these challenges, power-efficient automated passive underwater audio signal collection and analysis with machine learning is disclosed.

Techniques for monitoring acoustic data are disclosed. Monitoring acoustic data is enabled by accessing an acoustic sensor. The acoustic sensor includes an embedded acoustic controller which can host a machine learning model. The embedded acoustic controller can perform operations with a very low power demand. The machine learning model can include any type of model including a convolutional neural network (CNN), a support vector machine (SVM), a linear regression, a K-nearest neighbor (KNN) algorithm, and so on. Since the embedded acoustic controller is included in the acoustic sensor, underwater edge machine learning is enabled. This allows the ML models to run on low power, edge devices under the surface of a body of water. The acoustic sensor can include a plurality of embedded controllers, expanding the compute capabilities of the sensor. The acoustic sensor can be coupled to one or more hydrophones. A hydrophone can be a microphone designed for underwater use. A hydrophone can be designed to match the acoustic impedance of water. The hydrophones can enable passive acoustic monitoring. When multiple embedded controllers are included, a hydrophone can be dedicated to each embedded controller. Alternatively, various numbers of hydrophones can be associated with a single embedded controller, creating the ability to associate an embedded controller with unique hydrophone array shapes. The acoustic sensor can be deployed in a body of water. The deploying includes submerging the sensor in the body of water such as an ocean, lake, pond, river, and so on. The sensor can be coupled to a buoy to provide location stability and power. The buoy can also provide communications to a user above the surface of the body of water. One or more of the hydrophones receive an underwater audio signal. The underwater audio signal can be a result of any source such as an animal, a boat, manmade activity such as drilling, a natural occurrence such as an earthquake, and so on. The machine learning model classifies a predicted source of the underwater audio signal. The machine learning model can be trained such that the predicted source of the underwater audio signal is general, such as identifying an activity like fishing. The machine learning model can also be trained such that the predicted source can be more specific, such as identifying the sound of a specific animal within a specific species of marine life. Both general and specific identification of sources are possible by training the machine learning model. The acoustic sensor reports the predicted source of the underwater audio signal to a user. The reporting is accomplished using a communications device. The communications device can be included in a buoy which is coupled to the acoustic sensor. The communications device can be wired or wireless. The acoustic sensor can be powered by a battery. The acoustic sensor can employ a sleep mode to save battery life, lengthening its underwater operational effectiveness. The acoustic sensor can wake from the sleep mode by sensing a pressure threshold of the underwater audio signal.

FIG. 1 is a flow diagram for automated passive acoustic monitoring with machine learning. Monitoring and processing of underwater audio signals is enabled by an acoustic sensor. An acoustic sensor is accessed which includes an embedded acoustic controller. The embedded acoustic controller hosts a machine learning model. The acoustic sensor is coupled to one or more hydrophones. The acoustic sensor is deployed in a body of water, such as an ocean, lake, river, aquarium, and so on, where it receives an underwater audio signal. The machine learning model, which can be a convolutional neural network running on the embedded acoustic controller, classifies the underwater audio signal. The acoustic sensor reports to a user the predicted source. In embodiments, the predicted source comprises a marine mammal. In embodiments, the predicted source identifies a species of marine mammal. In further embodiments, the predicted source further identifies an individual animal within the species of mammal.

The flow 100 includes accessing an acoustic sensor 110. An acoustic sensor can be a device designed to detect, measure, process, etc. sound waves or acoustic signals in an underwater environment. The acoustic sensor includes an embedded acoustic controller. The embedded acoustic controller can be a simple microprocessor capable of running an industry standard instruction set architecture (ISA) such as X86, ARM, RISC-V, and so on. The embedded acoustic controller can run a low power architecture, a custom set of instructions, etc. The embedded acoustic controller can include specific audio functions, digital signal processing (DSP) functions, and so on. These functions can include filtering, logical operations, signal synchronization, modulation/demodulation, encoding/decoding, and so on. The embedded acoustic controller can enable a smaller size of processor and thus consumes far less power than a general purpose microprocessor. Lower power is an attractive feature for underwater operations due to the difficulty in replacing and/or recharging batteries under water for continuous operations. In embodiments, the acoustic sensor includes a plurality of embedded acoustic controllers. The acoustic sensor can include a power supply. The power supply can comprise a battery, a rechargeable battery, and so on. The acoustic sensor can include a power cable coupled to another power source such as a buoy, an unmanned underwater vehicle (UUV), and so on. The acoustic sensor can include a 2-wire interface for serial communications and power to and from other acoustic sensors, an above water vessel, an underwater vehicle such as a UUV, a buoy, and so on.

The embedded acoustic controller hosts a machine learning model. A machine learning model can be a computer program that can recognize and/or classify patterns in data. The recognized patterns can be used to make predictions and/or identify the same or similar patterns in other sets of data. The machine learning model can be adapted specifically for a low power, low footprint application. The machine learning model can comprise an embedded machine learning model, an edge machine learning model, a TinyML™ model, and so on. The machine learning model can be implemented on small, resource-constrained devices with extremely low power consumption, such as the embedded acoustic controller. In some embodiments, the embedded acoustic controller can operate on less than 100 peak milliwatts (mW) of power. Thus, the embedded machine learning model can run on the embedded acoustic controller powered by a small, lightweight battery for long periods of time, such as a month, a quarter, a year, multiple years, and so on, without requiring changing or recharging. The embedded acoustic controller can include dedicated machine learning hardware acceleration such as an artificial intelligence accelerator, a neural processing engine, and so on. The machine learning hardware can be used to accelerate machine learning operations such as convolutions, matrix multiplies, and so on. The machine learning hardware can be included internal or external to the embedded acoustic controller and can be designed for low power operation. The embedded acoustic controller can offload instructions, functions, programs, machine learning models, etc. to the dedicated hardware to accelerate machine learning operations within the acoustic sensor. In embodiments, the machine learning model can comprise a convolutional neural network (CNN). A CNN can be a specialized, feed-forward machine learning algorithm designed to recognize and classify patterns in data. The CNN can be optimized to detect specific patterns within ranges of data that represent natural and human-caused phenomena. In embodiments, the CNN can be used to identify and classify sounds received by the hydrophones and sent to the machine learning model by the embedded acoustic controller. The embedded acoustic controller can execute other supervised deep learning models such as a support vector machine, K-nearest neighbor, linear regression, and so on.

The acoustic sensor can be coupled to one or more hydrophones. The acoustic sensor can include a watertight enclosure. The hydrophones can be located within the interior of the watertight enclosure or can be external to the enclosure. The hydrophone can include one or more piezoelectric transducers. A single embedded acoustic controller can be coupled to more than one hydrophone. In embodiments, the acoustic sensor includes a plurality of embedded acoustic controllers. In further embodiments, each hydrophone in the one or more hydrophones is coupled 120 to a unique embedded acoustic controller in the plurality of embedded acoustic controllers. Any number of hydrophones can be coupled to any number of embedded acoustic controllers within the acoustic sensor. In embodiments, the hydrophones comprise micro-electro-mechanical system (MEMS) sensors.

Embodiments include serially coupling 130, at least two hydrophones. In embodiments, the serially coupling includes a daisy chained power over ethernet protocol. The serially coupling can enable 132 one or more customized array configurations. The array configurations can include a vertical array, a horizontal array, a square, a matrix, a random pattern, and so on. The various array configurations can enable 134 distributed beamforming. The distributed beamforming can be distributed receive beamforming. The receive beamforming can be based on time-of-arrival differences of an underwater signal at each hydrophone in the array. The beamforming can include combining delayed signals from two or more hydrophones. In embodiments, the distributed beamforming can localize a predicted source. The distributed beamforming can determine a bearing and range of a source of the underwater audio signal. The distributed beamforming can be based on a plurality of acoustic sensors. Each sensor in the plurality of sensors can include one or more hydrophones that are included in the distributed beamforming.

The flow 100 includes deploying 140, in a body of water, the acoustic sensor. The body of water can comprise an ocean, a lake, a river, a pond, an aquarium, and so on. The body of water can include fresh water, salt water, briny water, etc. The sensor can be deployed with a diver; from a surface vessel, a UUV, or a remotely operated underwater vehicle (ROUV); and so on. In embodiments, the acoustic sensor is submerged. This allows the hydrophones to collect underwater audio signals for the embedded acoustic controller to process. In embodiments, the acoustic sensor is coupled 142 to a buoy. The buoy can be a surface buoy. The buoy can be a drifting buoy, a moored buoy, a spotter buoy, an ice buoy, etc. The coupling can include other acoustic sensors, enabling communication between two or more sensors and the buoy. The coupling can include a wire for power, battery charging, and/or data communications. The coupling can include wireless communication methods such an acoustic modem, laser, photo communications, radio transmissions, and so on. The coupling can enable 2-way communication with the buoy and/or other acoustic sensors. The buoy can include one or more communications devices. The one or more communications devices can send data to a vessel, UUV, cloud server, a user, and so on.

Embodiments include providing, by the buoy, power 144 to the acoustic sensor. The providing power can include charging a battery included in the acoustic sensor. Charging the acoustic sensor's battery can also be accomplished by a UUV. The UUV can establish a link with the acoustic sensor. The charging by the UUV can be accomplished wirelessly underwater. The buoy can include one or more solar cells as a power source. In other embodiments, the buoy includes a battery. The buoy can include both a solar cell and a battery. The acoustic sensor can be coupled to a stationary surface vehicle to monitor acoustic signals from a specific area such as a coral reef. The acoustic sensor can also be dragged behind a surface or subsurface vehicle to provide monitoring of audio signals sourced over a large area. The acoustic sensor can be mounted in the hull of a such a surface or subsurface vehicle. In embodiments, the acoustic sensor is integrated with an unmanned underwater vehicle (UUV).

The flow 100 includes entering 150 a sleep mode, by the acoustic sensor. When the acoustic sensor relies on a battery for power, operations must be minimized to save power, ensuring the maximum functionality between charges or replacement. To avoid power loss, the acoustic sensor can be placed in a sleep mode. Operations can be minimized in the sleep mode. For example, power can be cut off to non-critical components. In this mode, the hydrophones can still listen for audio signals. Embodiments include waking 152, from the sleep mode, the acoustic sensor. The waking 154 can be based on one or more hydrophones coupled to the acoustic sensor. The one or more hydrophones can measure the acoustic pressure of an underwater audio signal. Since audio signals comprise pressure waves, a source that is close to the hydrophones will be louder than the same source further away. This can be represented in the acoustic pressure of the underwater audio signal. Thus, in further embodiments, the waking is based on an acoustic pressure threshold of the underwater audio signal. In this way, power can be conserved until an audio event representing a source of interest within a minimum audio level is detected and can be accurately classified by the machine learning model. The minimum audio level (e.g., the minimum acoustic pressure intensity) can be determined as the minimum threshold needed for the machine learning model to accurately classify the source. This minimum pressure threshold can be calculated, determined empirically, measured in-situ, and so on. A user can program the acoustic pressure threshold before or after the acoustic sensor is deployed. In embodiments, the acoustic sensor includes one or more micro-electro-mechanical system (MEMS) sensors. In further embodiments, the one or more MEMS sensors measure the acoustic pressure threshold. The measuring can be accomplished even though the acoustic sensor is in a sleep state.

The flow 100 includes receiving 160, by the one or more of hydrophones, an underwater audio signal. The signal can originate from marine life such as fish, shrimp, or whales; disturbances at the surface of the water such as rain or lightning; human activity such as boating or fishing; and so on. The hydrophones can detect underwater audio signals produced by one or more audio sources. The underwater audio signals can comprise time series analog signals. The signals can be a combination of some or all these sources, and each can vary over time. This can result both in noise and a shifting shape of the underwater audio signals that are received at the sensor. The hydrophones can convert the underwater audio signals into electrical signals and can send them to the embedded acoustic controller for storage, analysis, digital signal processing, and so on. The hydrophones can be set in a passive SOund Navigations And Ranging (SONAR) mode for receiving signals (listening mode). This can be an effective method of receiving underwater audio signals without giving away the position data of the sensor. In other embodiments, the hydrophone can be used as part of an active SONAR system wherein a pulse of sound is sent while the one or more hydrophones receive the reflections of that pulse.

The flow 100 includes classifying 170, by the machine learning model, a predicted source of the underwater audio signal. The classifying is based on the machine learning model. The machine learning model can run a neural network or other supervised deep learning models such as a support vector machine, K-nearest neighbor, linear regression, and so on. In embodiments, the machine learning model comprises a convolutional neural network (CNN). The CNN can include any number of input layers, hidden layers, output layers, etc. Each layer can include one or more nodes or "neurons". Each node can accept an input, apply a weight or a bias, generate an output, and so on. The classifying can identify a source, which can be a predicted source, of the underwater audio signal. The machine learning model can be based on one or more feature vectors of the underwater audio signal. The feature vectors can be based on any number of aspects of the underwater audio signal. These aspects can include the length of a specific sound, noise levels, signal energy within frequency bands, signal energies within wavelet scales, and so on. The one or more aspects can be transformed (explained in FIG. 2) by the acoustic embedded controller and used by the machine learning model to classify the predicted source. The machine learning model, which can run on the embedded acoustic processor, can enable underwater edge machine learning. Underwater edge machine learning can enable direct application of machine learning, within the acoustic sensor, to the audio signals received. This can eliminate the need for sending the audio signal, aspects of the signal, feature vectors, transformations of feature vectors, and/or other data to a larger processing engine, such as a server, server farm, and so on for processing and receiving results. Using underwater edge machine learning can enable low power operation, thus enabling machine learning functions within to the acoustic sensor which can be powered with a battery or other power source underwater.

The underwater audio signal can comprise a composite signal combining sounds from multiple underwater sources of interest. Each source of the sound can be in a separate, overlapping, or identical frequency range within the underwater audio signal. To be able to identify each source, embodiments include filtering 172, by the embedded acoustic controller, the underwater audio signal for a first frequency band. The first frequency band can be wide or narrow and can include any frequency range. A user can program the first frequency band. In embodiments, the first frequency band is associated 174 with a first source of interest. The first source of interest can comprise any natural occurrence, animal, or human activity. Thus, a user can program the embedded acoustic controller to search for a frequency range that is appropriate for the source desired. For example, if the source of interest is an underwater earthquake, a low frequency range of 1 Hz-100 Hz, or another appropriate frequency range, can be selected. However, if the source of interest is a dolphin whistle, a frequency range of 1 KHz-30 KHz, or another appropriate frequency range, can be selected. Filtering the underwater audio signal can lead to more accurate classification as it can eliminate additional "noise" from the frequencies that are most likely to capture sounds from the source of interest.

In embodiments, the filtering includes 176 a second frequency band. The filtering can include any number of frequency bands such as a third frequency band, a fourth frequency band, and so on. The number of frequency bands included can be based on the actual functions being performed by the embedded acoustic controller. As was the case with the first frequency band, the second frequency band can be wide or narrow and can include any frequency range. A user can program the second frequency band. In embodiments, the second frequency band is associated 178 with a second source of interest. The second source of interest can comprise any natural occurrence, animal, or human activity. Thus, a user can program the embedded acoustic controller to search for a frequency range that is appropriate for an additional source desired. In embodiments, the underwater audio signal is filtered for the first frequency band and the second frequency band simultaneously 180. Simultaneous filtering is enabled by the embedded acoustic controller. Simultaneous filtering of the underwater audio signal can comprise filtering for multiple frequency bands at the same time. Sequential filtering can include filtering an underwater audio signal for a first frequency, then filtering the same underwater audio signal for a second frequency. Simultaneous filtering can comprise substantially simultaneous filtering by the embedded acoustic processor. The simultaneous filtering can include more than one embedded acoustic controller. When multiple embedded acoustic controllers are included in the acoustic sensor, or when more than one acoustic sensor is employed, filtering for the first frequency band can be accomplished by a first embedded acoustic controller and filtering for the second frequency band can be accomplished by the second embedded controller. Filtering for two different bandwidths can enable simultaneous classification 182. Thus, in embodiments, the classifying includes a first classifying. In embodiments, the first classifying is based on the first frequency band. In further embodiments, the classifying includes a second classifying. In embodiments, the second classifying includes the second frequency band. In some embodiments, the first classifying and the second classifying occur simultaneously. Thus, the acoustic sensor is able to be programmed to detect multiple sources of a received underwater audio signal.

The flow 100 includes reporting 190 to a user, by the acoustic sensor, the predicted source of the underwater audio signal. As explained above and throughout, the acoustic sensor can be coupled to a buoy. The coupling can enable communication between the acoustic sensor and the buoy. The buoy can then report the information from the acoustic sensor to a user. The coupling can include other acoustic sensors, enabling communication between two or more sensors. The coupling can include a wire for power, battery charging, and/or data communications. The wired communications can include a serial interface such as a universal serial bus (USB) interface, RS-232, SPI, PCI Express, and so on. The coupling can include wireless communication methods such an acoustic modem, laser, photo communications, radio transmissions, and so on. The coupling can enable 2-way communication with the buoy and/or other acoustic sensors.

The buoy can include one or more communications devices. In embodiments, the reporting is accomplished using a communications device. In embodiments, the communications device is included in a buoy coupled to the acoustic sensor. The buoy can include one or more communications devices. The communication can include a classification, a probability, a threat level, and/or other data associated with the prediction of the source of the audio signals. For example, if the acoustic sensor determines with a high degree of accuracy that the source of the audio signal is a whale, a low threat level with a high probability score may be associated with the source. Likewise, if the acoustic sensor determines with a low certainty that that the audio source is consistent with illegal fishing activities, a high threat level can be associated along with a low probability score. The reporting can include more than one predicted source as described above. The communications device can send the predicted source, along with other information, to a user through wireless communication to a vessel, UUV, or another amphibious vehicle; satellite communications; cellular networks; and so on.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors. Various embodiments of the flow 100, or portions thereof, can be included on a semiconductor chip and implemented in special purpose logic, programmable logic, and so on.

Figure 2:
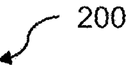
FIG. 2 is a flow diagram for classifying a source.
Figure 2:
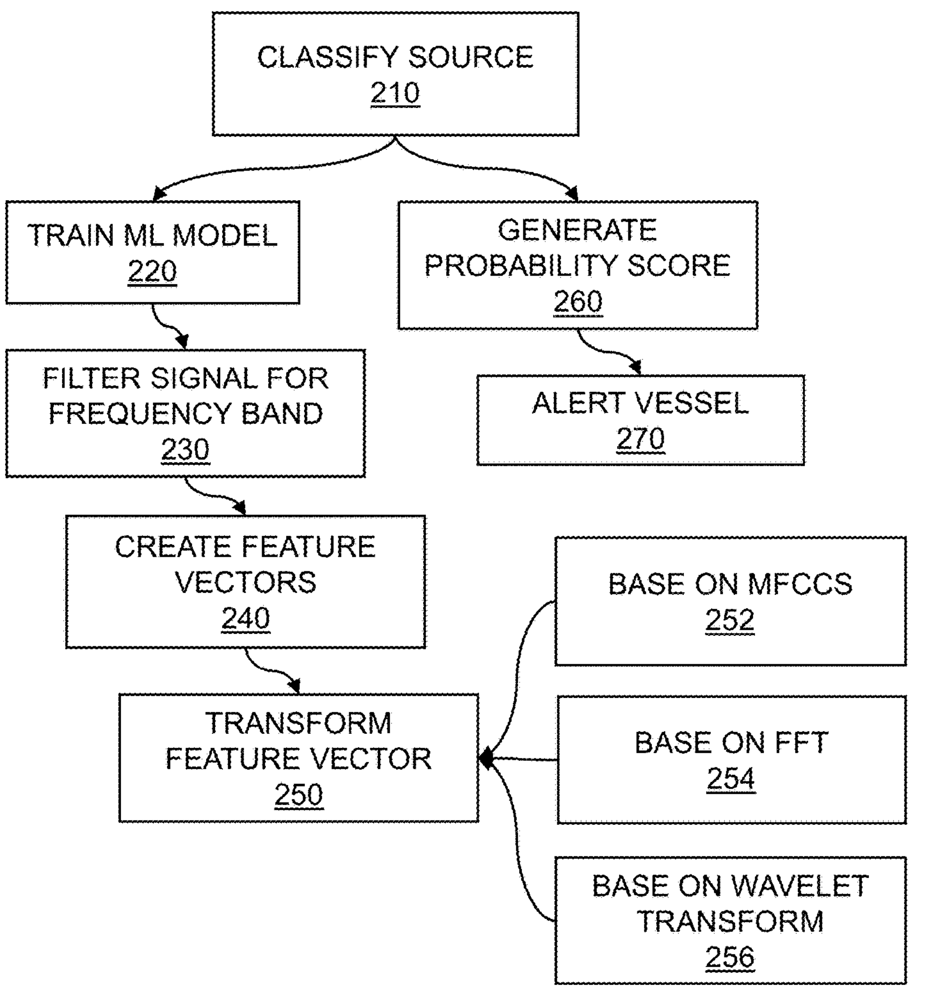

FIG. 2 is a flow diagram for classifying a source. Classification of an underwater audio signal can identify an underwater source. The classifying can be based on one or more feature vectors which are created by the machine learning model. The one or more feature vectors can be transformed by one or more transformations including Mel-frequency cepstral coefficients, a fast Fourier transform, a wavelet transform, and so on. The machine learning model can classify any natural or human made source, which can include a marine mammal, a species of marine mammal, and a specific animal within the species of marine mammal.

The flow 200 includes classifying 210, by the machine learning model, a predicted source of the underwater audio signal. As described above and throughout, the classifying is based on the machine learning model. The machine learning model can run a neural network or other supervised deep learning models such as a support vector machine, K-nearest neighbor, linear regression, and so on. In embodiments, the machine learning model comprises a convolutional neural network (CNN). The CNN can include any number of input layers, hidden layers, output layers, and so on. Each layer can include one or more nodes or "neurons". Each node can accept an input, apply a weight or a bias, generate an output, and so on. The classifying can identify a source, which can be a predicted source, of the underwater audio signal.

In embodiments, the predicted source comprises a marine mammal. For example, the machine learning can classify a source as a whale, a dolphin, a seal, a manatee, etc. The machine learning model can compare various feature vectors of the underwater signal and match them to sounds created by any of these, or other, mammals found in the body of water. The predicted source can comprise one or more marine mammals. In embodiments, the predicted source comprises a species of marine mammal. The machine learning model can classify the underwater audio signal as sourced from a certain order within a species of mammal. For example, the machine learning model can classify that an underwater audio signal is from a cetacean (e.g., a whale or dolphin), a pinniped (e.g., a seal or sea lion), a sirenian (e.g., a manatee), and so on. The machine learning model can classify suborders and families within a species. In further embodiments, the predicted source comprises an individual animal within a species of marine mammal. Further, the predicted source can comprise one or more individual animals within a species of mammal. For example, the machine learning model can classify one or more specific whales within a pod of whales. Likewise, the machine learning model can classify one or more specific dolphins within a pod of dolphins. Thus, automated passive acoustic monitoring with machine learning can be an effective way to track specific marine mammals to observe behavior, social interaction, migration patterns, and so on.

The flow 200 includes training 220 the machine learning model. The training can include adjusting weights and biases associated with layers, such as hidden layers, within a neural network. Further adjustments can be made based on determinations of known/unknown, dolphin/whale, real/fake, and so on. The training can include the use of one or more training datasets. The datasets can be based on a plurality of underwater audio signals from various species, orders, suborders, families, etc. of marine mammals. The datasets can comprise one or more feature vectors that include aspects of the underwater audio signal such as the length of a specific sound, noise levels, energy within frequency bands, signal energies within wavelet scales, statistics of the underwater audio signal, statistics of a transformed underwater audio signal, and so on. The datasets can include training audio data from a specific animal within a species of marine mammal such as a specific whale or a specific dolphin. In embodiments, the training is based on one or more underwater audio signals from the individual animal within the species of marine mammal. The training data can include underwater audio sounds from fish, shrimp, and other underwater sea animals.

The training data can include sources of underwater sounds not linked to aquatic life. For example, sample underwater sounds of human activity such as vessel propulsion, UUV propulsion, mining, fishing, and so on can be included in the training data so that the machine learning model can accurately classify such activities. Natural phenomena such as earthquakes, waves, rain, lightning strikes, and so on can also be included. The training data can include actual recordings of underwater sounds and can include background noise. The training data can also include synthetic data, created to mimic the underwater audio signal of various predicted sources, such as those described above.

The one or more hydrophones can be capable of receiving acoustic data across a wide range of frequencies, for example, from 1 Hz to 500 kHz. The flow 200 can include filtering 230, by the acoustic embedded controller, the underwater audio signal for a frequency band. A filter can be a device that removes unwanted components or features from an audio signal. The frequency band, which can be associated with a source of interest, can be selected, programmed, etc. by a user. The filtering can remove specific frequencies or frequency bands from the acoustic signal. This can eliminate "noise" in the underwater audio signal, which can enable the machine learning model to classify the source of interest more quickly and/or accurately. In a usage example, a user interested in dolphin activity can select a frequency band of 100 Hz to 100 kHz, or another appropriate frequency band, when interested in classifying dolphins, while a user interested in ship traffic can select a lower frequency band such as 10 Hz to 1 kHz or another appropriate frequency band. In some embodiments, the filtering can alter the amplitude and/or phase of the acoustic signal with respect to frequency. The filter can be analog or digital, continuous-time or discrete-time, linear or non-linear, causal or non-causal, and so on. The filter can comprise a high-pass filter, low-pass filter, band-pass filter, and the like. The filtering can be accomplished by a separate device in the acoustic sensor or can be accomplished by the acoustic embedded controller via software-defined functions. The acoustic embedded controller can be programmed to determine which frequencies to pass to the machine learning model, which to reject, and so on. The filtering can be fine-tuned to classify any animal, manmade activity, or natural activity that produces an underwater acoustic signal. For example, the filtering can be based on a specific species order, suborder, family, etc. of marine mammal, or an individual animal within the species of marine mammal. In embodiments, the individual animal is associated with the frequency band.

The flow 200 includes creating 240 one or more feature vectors from the underwater audio signal. In embodiments, the classifying is accomplished using one or more feature vectors. The feature vectors can be based on one or more aspects of the underwater audio signal. The aspects can include the length of a specific sound, noise levels, energy within frequency bands, signal energies within wavelet scales, statistics of the underwater audio signal, statistics of a transformed underwater audio signal, and so on. Many other aspects are possible. The feature vector can contain any aspect, or attributes, of the underwater audio signal, or multiple aspects of the signal. The feature vectors can include a tensor which can comprise an array of one or more dimensions. Each dimension can include one or more aspects related to the underwater audio signal. In embodiments, the one or more feature vectors are created by the embedded acoustic controller. In further embodiments, the one or more feature vectors are based on the underwater audio signal.

The flow 200 includes transforming 250 the one or more feature vectors. Transforming an audio signal can modify the way in which the signal is represented within a feature vector. Audio signals can be transformed in one or more ways to allow for various types of analysis. In embodiments, transforming aspects of underwater signals can allow the signals to be separated from one another and identified based on their unique frequency characteristics. In embodiments, the transforming is based on Mel-frequency cepstral coefficients (MFCCs) 252. The MFCCs can be coefficients within a Mel-frequency cepstrum (MFC). The MFC can be a representation of the power spectrum of the underwater audio signal. In other embodiments, the transforming is based on a fast Fourier transform (FFT) 254. An FFT can convert an analog signal, such as the underwater audio signal, to the frequency domain. In this way, the signal can be decomposed into one or more constituent frequencies. Each constituent frequency can be evaluated for magnitude (power). In other embodiments, the transforming is based on a wavelet transformation 256. A wavelet transformation can decompose a function into a set of wavelets, which can be frequency components within a signal, such as an underwater audio signal, localized in time. While an FFT can analyze an entire signal, a wavelet transformation can perform localized time-frequency analysis.

The flow 200 includes generating 260 an associated probability score. When properly trained, the machine learning model can accurately classify many different types of sources. However, the process of classifying often does not lead to 100% accurate results. The machine learning model can generate a probability score, which can indicate the probability that the machine learning model has accurately classified one or more sources in an underwater audio signal. In embodiments, the associated probability score predicts an accuracy of the classifying. In a usage example, the disclosed acoustic sensor can capture an underwater audio signal which includes whale vocalizations. The machine learning model, hosted by the embedded acoustic controller, can classify the predicted source as a whale. An accuracy of the classification can be generated, which can be based on the signal obtained, the type of machine learning model, the aspect of the signal selected to be used for the one or more feature vectors, the transformation applied on the one or more feature vectors, and so on. In a usage example, the acoustic sensor can notify a user that it has detected a whale with 75% accuracy. Any accuracy can be associated with the classifying. The machine learning model can associate a probability score with classifying a species of marine mammal. Embodiments include alerting 270 a vessel of the species of marine mammal. The alerting can be included in the reporting. The alerting can comprise a separate communication to the vessel. The alerting can be accomplished using a communications device. The communications device can include wireless communications; cellular communications such as LTE, 5G, and so on; radio transmissions, satellite communications; and so on. In embodiments, the communications device is included in a buoy coupled to the acoustic sensor. In a usage example, the machine language model can classify a marine mammal with 80% accuracy and alert a nearby vessel to avoid the possibility of a whale strike.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors. Various embodiments of the flow 200, or portions thereof, can be included on a semiconductor chip and implemented in special purpose logic, programmable logic, and so on.

Figure 3:
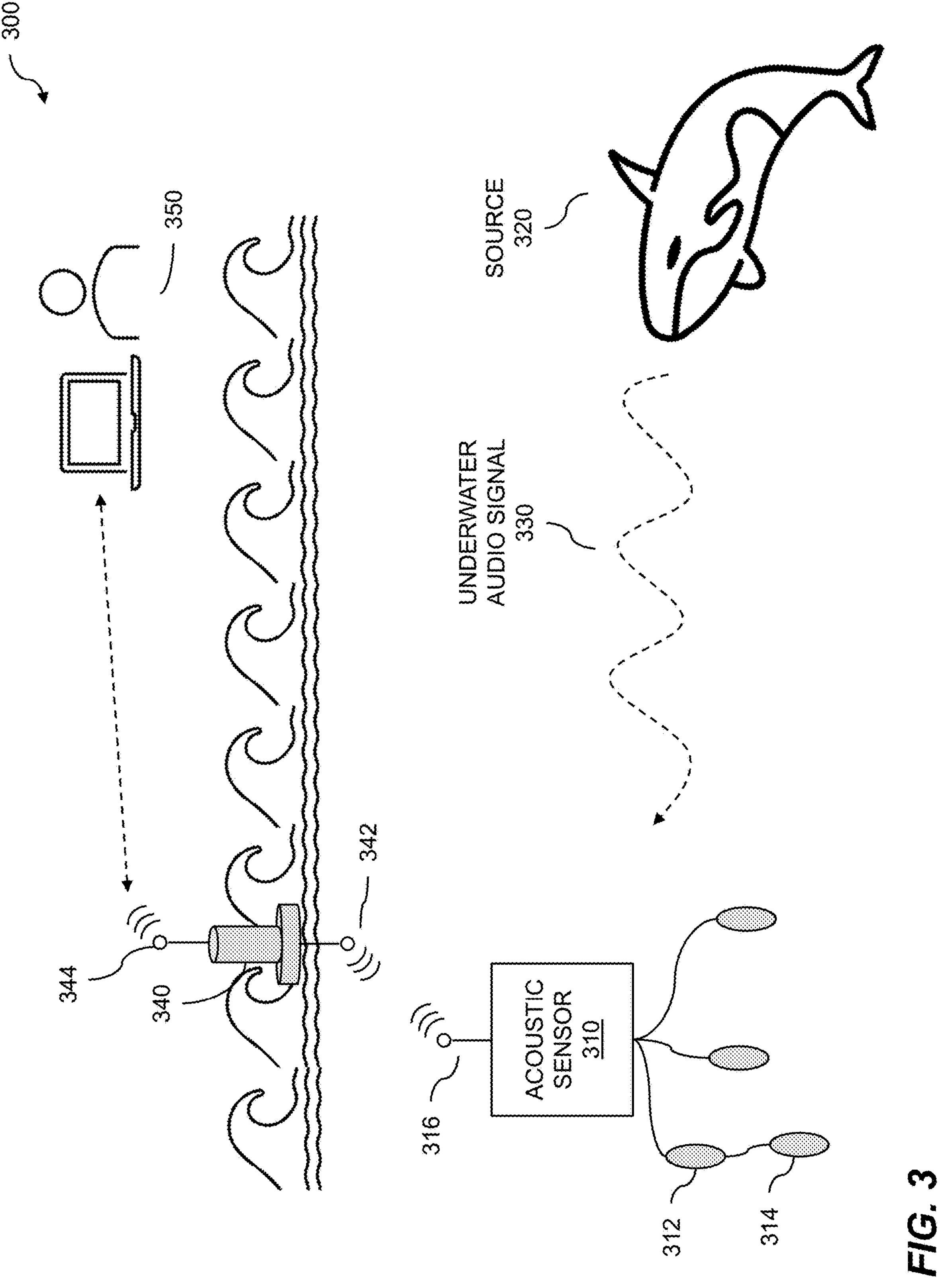
FIG. 3 is an infographic for automated passive acoustic monitoring with machine learning.

FIG. 3 is an infographic for automated passive acoustic monitoring with machine learning. Classification of an underwater audio signal is enabled by an acoustic sensor with hydrophones. The acoustic sensor includes an embedded acoustic controller which can host a machine learning model. The machine learning model can classify one or more predicted sources from an underwater audio signal received by the hydrophones. The flow 300 includes an acoustic sensor 310. In embodiments, the acoustic sensor is accessed. As described above and throughout, the sensor can convert sound waves into electrical signals which can be analyzed and processed. In embodiments, the acoustic sensor includes an embedded acoustic controller. In other embodiments, the acoustic sensor includes a plurality of embedded acoustic controllers. The embedded acoustic controller can run a known instruction set architecture, a low power architecture, a custom set of instructions, etc. The embedded acoustic controller can run custom audio functions; digital signal processing (DSP) functions such as signal filtering, logical operations, signal synchronization, modulation/demodulation, encoding/decoding, etc.; and so on. The user can program the custom audio functions and DSP functions. The programming can be accomplished remotely while the acoustic sensor is deployed underwater. The embedded acoustic controller can enable a smaller chip size than a general purpose microprocessor and thus can consume less power, enabling long-term underwater operations without recharging or replacing batteries which can supply power to the acoustic sensor. In embodiments, the embedded acoustic controller hosts a machine learning model. The machine learning model can include any of a number of machine learning algorithms including a CNN, an SVM, a linear regression, a KNN algorithm, etc.

In embodiments, the acoustic sensor is coupled to one or more hydrophones 312. Embodiments include serially coupling at least two hydrophones 312, 314 within the one or more hydrophones. The at least two hydrophones can be serially coupled through a wired or wireless protocol. The wired protocol can include any available communications protocol including PCI-Express (PCI-E), RS-232, SPI, PCI Express, and so on. The communications can be enabled by a customized 2-wire interface for power and communications between coupled hydrophones. The communications can be based on open standards such as Bristlemouth. Wireless protocols can include an acoustic modem, acoustic link, laser, radio transmissions, and so on. In embodiments, the serially coupling includes a daisy chained power over ethernet protocol. In further embodiments, the serially coupling enables distributed beamforming, wherein the distributed beamforming localizes the predicted source. The distributed beamforming can include determining a bearing and range of a source of the underwater audio signal. In embodiments, the serially coupling enables one or more customized array configurations. The array configurations can include a vertical array, a horizontal array, a square, a matrix, a random pattern, and so on.

Embodiments include deploying, in a body of water, the acoustic sensor. In further embodiments, the acoustic sensor is submerged. In embodiments, the acoustic sensor is coupled 316 to a buoy 340. The coupling can include a wire (not shown) for power, charging, and/or data communications. The coupling can include wireless communication methods such an acoustic modem, laser, radio transmissions, and so on. A matching communication method 342 can be included in a buoy to enable 2-way communication. The acoustic sensor can include a power supply. The power supply can comprise a battery, a rechargeable battery, and so on. The power supply can include a power cable coupled to another power source such as a buoy, an unmanned underwater vehicle (UUV), and so on.

The flow 300 includes a source 320, which can be a predicted source. The predicted source can be the source of an underwater audio signal 330. Other sources can be included in the underwater audio signal. The predicted source can comprise any natural or manmade sound found in the underwater environment. Examples can include surface noises such as boats, rain, lightning, and so on. Other examples of predicted sources can be activities such as swimming, diving, fishing, boating, drilling, and so on. Further examples of predicted sources can be natural occurrences such as underwater earthquakes. Other examples of predicted sources include underwater animals including fish and mammals. Many other predicted sources can generate underwater audio signals. In embodiments, the predicted source comprises a marine mammal. In other embodiments, the predicted source comprises a species of marine mammal. In further embodiments, the predicted source comprises an individual animal within the species of marine mammal. Embodiments include receiving, by the one or more hydrophones, an underwater audio signal. Further embodiments include classifying, by the machine learning model, a predicted source of the underwater audio signal. After the machine learning model has classified one or more sources of the underwater audio signal, the acoustic sensor can send the predicted source to a user. Thus, embodiments include reporting, to a user 350 by the acoustic sensor, the predicted source of the underwater audio signal. In embodiments, the reporting is accomplished using a communications device 344. In further embodiments, the communications device is included in the buoy. The communications device can be based on wireless technology, cellular technology such as long term evolution (LTE) broadband wireless or 5G, Bluetooth, satellite communications, or another communications method or protocol to send data to a user. The communications device can send data from the acoustic sensor directly to a vessel, UUV, or another aquatic vehicle where a user can be located.

Figure 4:
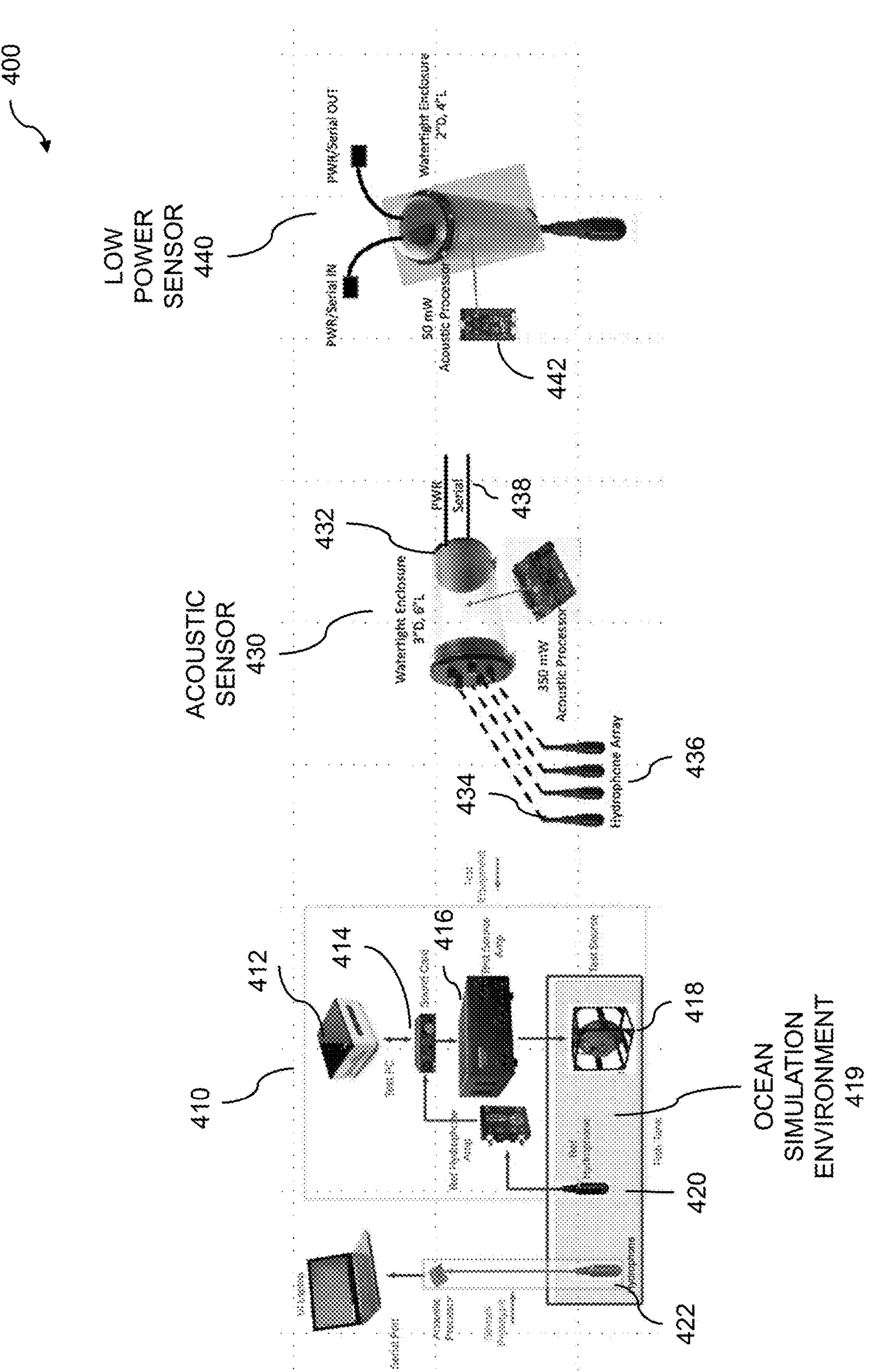
FIG. 4 is an illustration of equipment for automated passive acoustic monitoring with machine learning.

FIG. 4 is an illustration of equipment for automated passive acoustic monitoring with machine learning. An acoustic sensor can be tested prior to deployment. The testing equipment can ensure that the sensor is able to accurately receive and classify underwater audio signals. As shown in the illustration 400, equipment for automated passive acoustic monitoring with machine learning can include testing equipment 410. The equipment can include a computer 412, a sound card 414, a test source amplifier 416, and an underwater speaker 418 which can be used in the ocean simulation environment 419. The computer, which can be a PC, a server, etc. can drive a sound card to reproduce audio sounds that mimic an oceanic environment. The audio sounds can include samples of one or more sources of underwater audio signals such as earthquakes, fishing, vessel propulsion, mammals, and so on. The sound card can use the sound file to drive sound to the test source amplifier. The sound file can be based on acoustic modeling of a time-delayed reflection from an underwater source. The test source amplifier can amplify the audio signals and drive the underwater speaker. In embodiments, a reference hydrophone 420 can be placed near one or more hydrophones 422 coupled to the acoustic sensor under test. The reference hydrophone can be coupled to a reference hydrophone amplifier which amplifies signals picked up by the reference hydrophone. The reference hydrophone can then be used to calibrate the sound card to ensure that the audio signals from the speaker accurately reflect an audio signal from an oceanic environment. The response of the speaker can be measured and equalized. The testing can include additional reference hydrophones. The ocean simulation environment can include a fish tank. The ocean simulation environment can be used to train a machine learning model included in an embedded acoustic controller within a submerged acoustic sensor.

The equipment can include an acoustic sensor 430. The acoustic sensor can include one or more embedded acoustic controllers capable of hosting a machine learning model. In embodiments, the machine learning model can include a convolutional neural network. To protect from the elements, the acoustic sensor can be enclosed in a watertight enclosure 432. The acoustic processor can be coupled to one or more hydrophones 434 which can protrude from the watertight enclosure. Embodiments include serially coupling at least two hydrophones within the one or more hydrophones. In further embodiments, the serially coupling enables one or more customized array configurations 436. The one or more hydrophones can be included within the watertight enclosure. The acoustic sensor can include a power supply and/or it can be powered by the coupled buoy. Data communications between the acoustic sensor and the buoy can be achieved with a serial interface 438, wireless communications, acoustic modem, acoustic link, laser, radio transmissions, and so on.

The equipment can include an ultra-low power acoustic sensor 440 which can employ an ultra-low-power acoustic embedded controller architecture 442. The ultra-low power acoustic embedded controller can host a machine learning model. The machine learning model can comprise an embedded machine learning model, an edge machine learning model, a low power machine learning model, a small footprint machine learning model, a TinyML™ model, and so on. The ultra-low-power acoustic sensor, which can be an acoustic sensor, can include a sleep mode. Embodiments include entering a sleep mode, by the acoustic sensor. Further embodiments include waking, from the sleep mode, the acoustic sensor. In other embodiments, the waking is based on an acoustic pressure threshold of the underwater audio signal. In embodiments, the acoustic sensor includes one or more micro-electro-mechanical system (MEMS) sensors. In further embodiments, the one or more MEMS sensors measure the acoustic pressure threshold. Thus, the MEMS sensors can wake the acoustic sensor from the sleep mode when an underwater audio signal of sufficient amplitude is encountered. A user can program the pressure threshold. In this way, power can be conserved, extending the battery life of the acoustic sensor. The ultra-low-power acoustic sensor can include an input serial data interface and an output serial data interface. These interfaces can be used to string additional hydrophones together to enhance monitoring of underwater acoustic signals.

Figure 5:
FIG. 5 is a diagram of an acoustic sensor with hydrophones.
Figure 5:
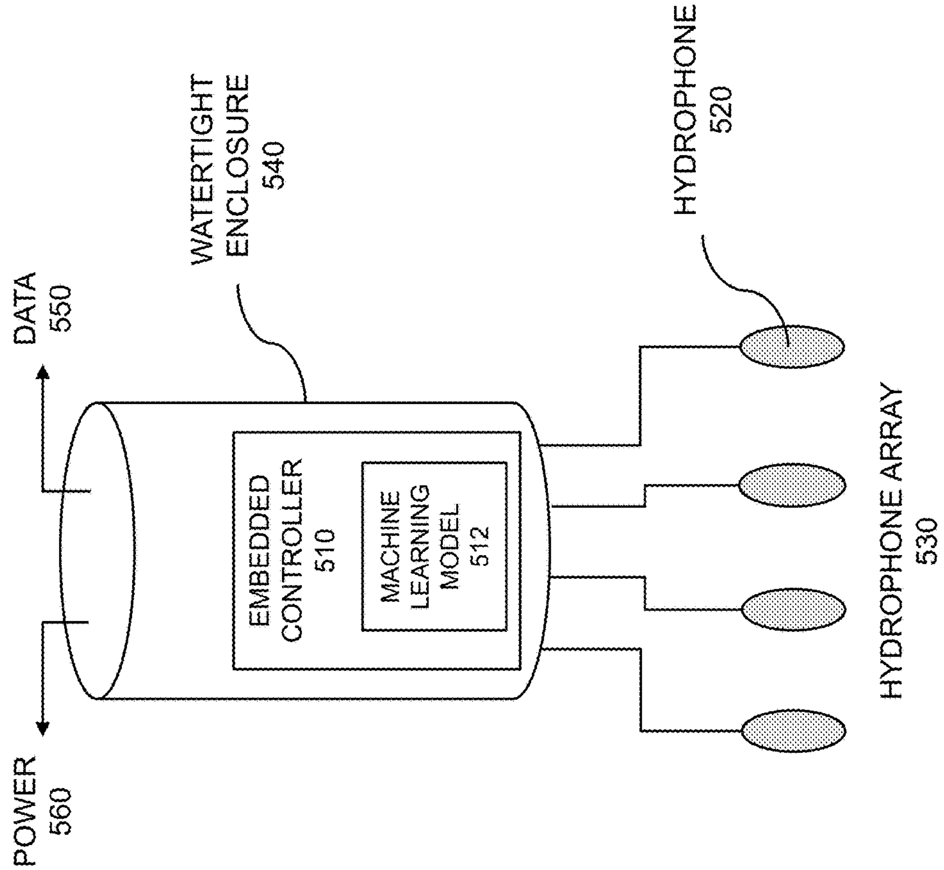

FIG. 5 is a diagram of an acoustic sensor with hydrophones. An acoustic sensor enables passive acoustic monitoring with machine learning. The diagram 500 includes an acoustic sensor. The acoustic sensor can include an embedded acoustic controller 510. The embedded acoustic controller can host a machine learning model 512. The acoustic sensor can include a plurality of embedded acoustic controllers. The acoustic sensor can be coupled to one or more hydrophones 520. In embodiments, each hydrophone in the one or more hydrophones is coupled to a unique embedded acoustic controller in the plurality of embedded acoustic controllers. The acoustic processor can include a hydrophone array 530. Embodiments include serially coupling at least two hydrophones within the one or more hydrophones. In embodiments, the serially coupling includes a daisy chained power over ethernet protocol. In other embodiments, the serially coupling enables one or more customized array configurations. The array configurations can include a horizontal line, a vertical line, a square, a matrix, a random pattern, and so on. The array can be towed horizontally behind a boat or ship. In embodiments, the serially coupling enables distributed beamforming. As sound waves reach the hydrophones in the array, they arrive at each hydrophone at slightly different times. The time difference between the hydrophones can be used to indicate the direction of the sound being detected. In some embodiments, two or more acoustic sensors with hydrophones can be deployed and used together. Time variations between hydrophone arrays can be used to determine the location of sources of sounds more precisely. Thus, in embodiments, the distributed beamforming localizes the predicted source. The distributed beamforming can determine a bearing and range of a source of the underwater audio signal.

The embedded acoustic controller can be housed in a watertight enclosure 540. The watertight enclosure can be made of metal, plastic, polymer, or any combination of materials. Watertight plugs for connecting the hydrophone array to the acoustic embedded controller can be included in the watertight enclosure. In embodiments, the machine learning model can be included on the embedded acoustic controller. The controller can include a processor, memory, input/output peripherals, DSP hardware accelerators, and so on. Machine learning model algorithms can be written to the embedded acoustic controller and the controller can be connected to the hydrophone array to receive audio signal input. Data storage can be included on the controller or housed on separate low-power memory chips within the watertight enclosure. A data connection 550 can be included on the acoustic sensor for sending data to other acoustic sensors, a buoy, a vessel, a UUV, a diver, a remote user, and so on. The data connection can be bidirectional. The data connection can include a wireless connection, an acoustic modem, photo communications, laser communications, and so on.

The diagram 500 can include a power connection 560 for the acoustic sensor and hydrophones. The power connection can be coupled to another power source such as a buoy, an unmanned underwater vehicle (UUV), and so on to provide power to the acoustic sensor or to charge one or more batteries contained inside the acoustic processor (not shown) to power the unit. The batteries can be contained within the watertight enclosure. The power connection can supply power directly to the acoustic processor. In embodiments, the power supply can be a fully potted power supply. A fully potted power supply uses a solid or gelatinous compound to completely surround the electrical components and seal them in a waterproof casing. This protects the electrical assembly from moisture, shock, and vibration. In embodiments, the power supply can be comprised of one or more batteries developed for underwater use. Underwater battery types can include lithium-ion, flooded lead-acid (FLA), sealed lead-acid (SLA), absorbed glass mat (ACM), and aluminum-water batteries which use seawater to operate. The one or more batteries can be charged. The charging can be accomplished with the power connection to an external power source, such as buoy or vessel. The charging can be accomplished by a UUV that can establish a link with the acoustic sensor. The charging can be accomplished wirelessly underwater by the UUV. The power and data connections can be included in the same conduit, serviced by a single wire via a power over Internet (PoI) protocol, and so on.

Figure 6:
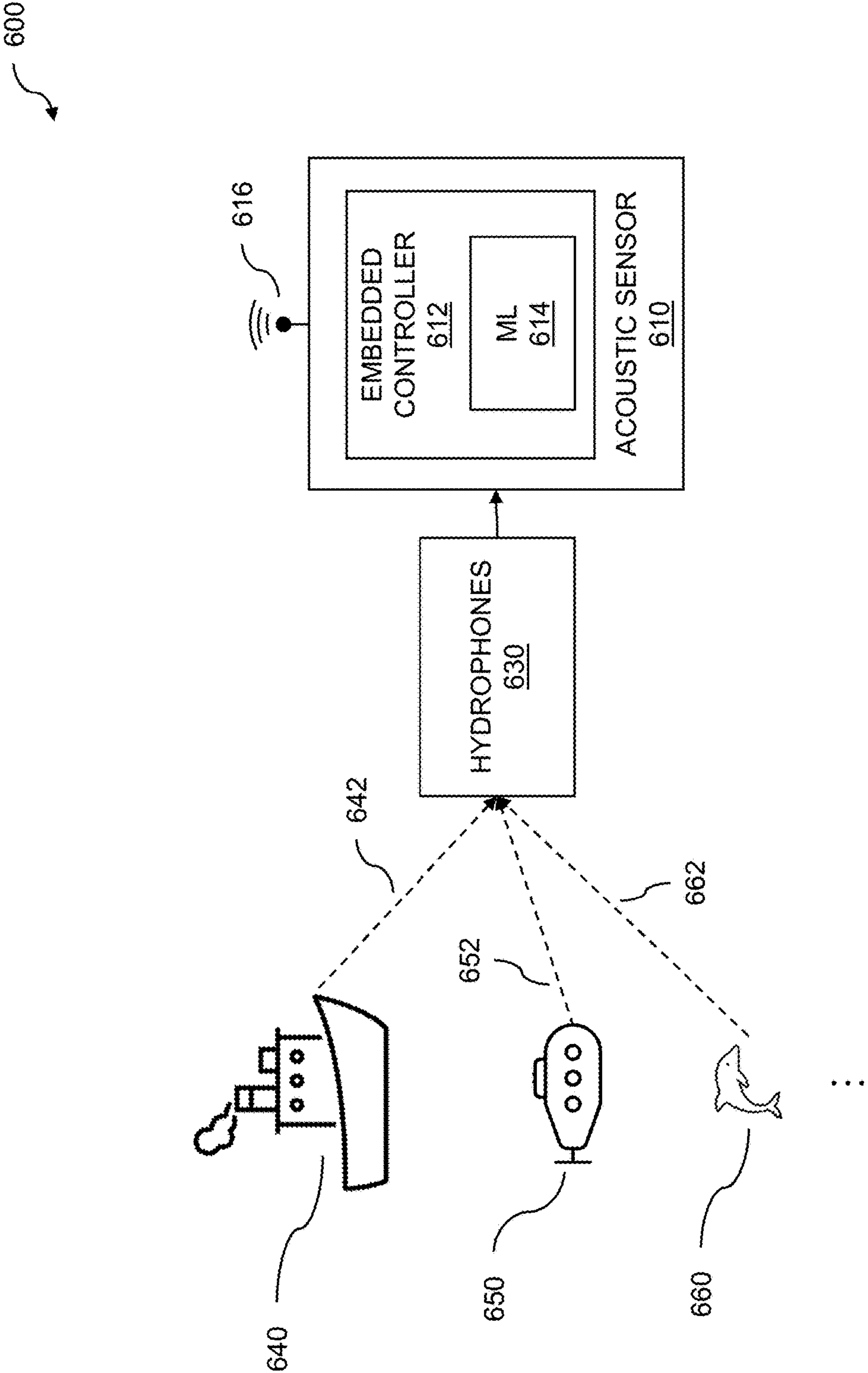
FIG. 6 is an example of filtering for multiple frequency bands.

FIG. 6 is an example of filtering for multiple frequency bands. An acoustic sensor enables passive acoustic monitoring with machine learning. An acoustic sensor can be submerged in a body of water. The acoustic sensor is coupled to one or more hydrophones. The acoustic sensor includes an embedded acoustic controller which hosts a machine learning model capable of classifying a predicted source of underwater audio sounds detected by the hydrophones. To increase the accuracy of the machine learning model, the underwater audio signal can be filtered for a bandwidth of interest.

The example 600 includes an acoustic sensor 610. As explained above and throughout, the acoustic sensor is a device designed to detect, measure, classify, process, etc. sound waves or acoustic signals in an underwater environment. The acoustic sensor can include a watertight enclosure, one or more batteries, an embedded acoustic controller 612, and so on. The acoustic sensor can include a communications device 616. In embodiments, the acoustic sensor is coupled to a buoy. The coupling can be based on the communications device. The coupling can include other acoustic sensors, enabling communication between two or more sensors. The coupling can include a wire (not shown) for power, charging, and/or data communications. The coupling can include wireless communication methods such an acoustic modem, laser, radio transmissions, and so on. The coupling can enable 2-way communication with the buoy and/or other acoustic sensors. The acoustic sensor can include a power supply. The power supply can comprise a battery, a rechargeable battery, and so on. The power supply can include a power cable coupled to another power source such as a buoy, an unmanned underwater vehicle (UUV), and so on. The acoustic sensor can be coupled to one or more hydrophones 630. The coupling can be based on watertight plugs.

The embedded controller can include a machine learning model 614. Many types of machine learning algorithms such as a neural network, KNN, SVM, linear regression, and so on can be implemented. In embodiments, the machine learning model comprises a convolutional neural network. The machine learning model can classify a predicted source of an underwater audio signal detected by the one or more hydrophones. The detection and classification of many different types of sources, which can be sources of interest, are possible. The classification can be based on filtering an underwater audio signal. The filtering can be accomplished by devices within the acoustic sensor, by the embedded acoustic controller, and so on.

The example 600 can include a first source 640, which can be a surface vessel. In practice the first source can comprise any living creature or any manmade or natural event that emits an underwater audio signal. The surface vessel can emit an underwater audio signal that is associated with a first frequency band 642. In embodiments, the classifying is based on filtering, by the embedded acoustic controller, the underwater audio signal for a first frequency band. In embodiments, the first frequency band is associated with a first source of interest. The example 600 can include a second source 650, which can be an unmanned underwater vehicle (UUV). In practice, the second source can comprise any living creature or any manmade or natural event that emits an underwater audio signal. The UUV can emit an underwater audio signal that is associated with a second frequency band 652. In embodiments, the filtering includes a second frequency band, wherein the second frequency band is associated with a second source of interest. In embodiments, the underwater audio signal is filtered for the first frequency band and the second frequency band simultaneously. The underwater audio signal can be filtered for the first frequency band and the second frequency band substantially simultaneously. The underwater audio signal can be filtered for the first frequency band and the second frequency band within a close time period, for example, 1 microsecond, 10 microseconds, 100 microseconds, 1 millisecond, 10 milliseconds, and so on. This can be accomplished by a single acoustic embedded controller, or with one or more additional embedded controllers that can be included in the acoustic sensor. Filtering an underwater audio signal for multiple frequencies at once can enhance the effectiveness of the machine learning algorithm by enabling the classification of more than one source of interest at the same time. In embodiments, the classifying includes a first classifying. In further embodiments, the first classifying is based on the first frequency band. In embodiments, the classifying includes a second classifying. In embodiments, the second classifying includes the second frequency band. In some embodiments, the first classifying and the second classifying occur simultaneously. The filtering and classifying can include any number of sources in parallel. For example, the example 600 includes a third source 660, which can be a dolphin, which can emit an underwater audio signal associated with a third frequency band 662. The filtering and classifying can include the third frequency band in parallel with the first and second frequency bands.

As mentioned previously, the machine learning model can classify any predicted source that creates an underwater audio signal. The predicted source can comprise any natural or manmade sound found in the underwater environment. Examples can include surface noises such as boats, rain, lightning, and so on. Other examples of predicted sources can be activities such as swimming, diving, fishing, boating, drilling, and so on. Further examples of predicted sources can be natural occurrences such as earthquakes. Other examples of predicted sources include underwater animals including fish and mammals. Many other predicted sources can generate underwater audio signals. Referring back to example 600, a third source 660 is shown as a dolphin. In embodiments, the predicted source comprises a marine mammal. In other embodiments, the predicted source comprises a species of marine mammal. In further embodiments, the predicted source further comprises an individual animal within the species of marine mammal. When the predicted source is an individual animal within a species, the filtering can specifically target a known frequency band associated with the animal. Thus, embodiments include filtering, by the acoustic embedded controller, the underwater audio signal for a frequency band. In further embodiments, the individual animal is associated with the frequency band. In order to classify the specific animal, the machine learning model must be trained. The training can include one or more underwater audio signals which contain sounds from the specific animal, other animals, and/or other noises. Thus, embodiments include training the machine learning model. In embodiments, the training is based on one or more underwater audio signals from the individual animal within the species of marine mammal.

Figure 7:
FIG. 7 is an example of a convolutional neural network.
Figure 7:
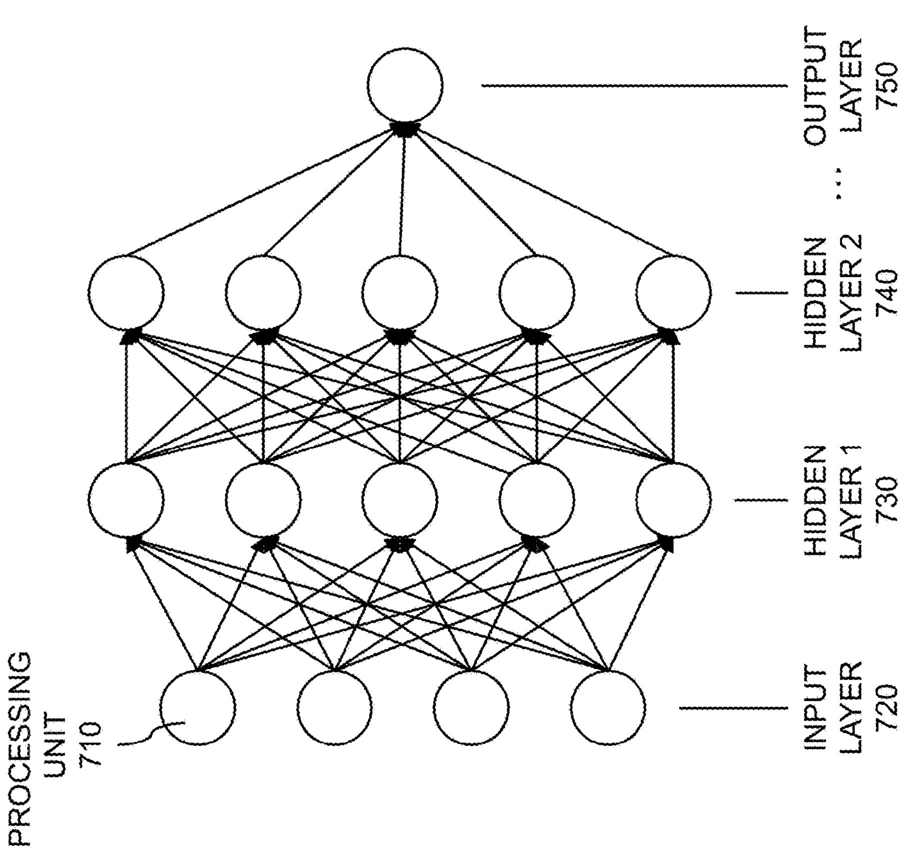

FIG. 7 is an example of a convolutional neural network. A machine learning model enables classification of underwater audio sources through passive acoustic monitoring with machine learning. In embodiments, the machine learning model comprises a convolutional neural network (CNN). A CNN can be a system of interconnected programming objects, called neurons, which can exchange messages among each other. The connections among the neurons can have numeric weights that can be altered during the training process so that the desired responses are received when new input is entered into the network. The network can comprise two or more layers of feature-detecting neurons. The layers can include an input layer, one or more hidden layers, and an output layer. Each layer can include many neurons that respond to different combinations of inputs from the previous layers.

The example 700 includes a processing unit 710. The processing unit can be a microprocessor, embedded processor, processor core, functional unit, software thread, program function, and so on. The example 700 includes an input layer 720 of convolutional neural network neurons. The input layer can be the starting point for processing data in a neural network. The input layer can receive data that represents acoustic data received from the hydrophones coupled to the acoustic sensor. The data can comprise one or more feature vectors. The feature vectors can be based on any number of aspects of the underwater audio signal received by the hydrophones. Examples of aspects of the underwater signal can include the length of a specific sound, noise levels, energy within frequency bands, signal energies within wavelet scales, statistics of the underwater audio signal, statistics of a transformed underwater audio signal, and so on. Many other aspects are possible. The acoustic underwater signal can be filtered for a specific frequency band before the aspects of the signal are selected. This can limit background noise or unwanted audio in the signal and can increase the ability of the machine learning model to make an accurate classification. In embodiments, the classifying is accomplished using one or more feature vectors. In embodiments, the one or more feature vectors are created by the embedded acoustic controller. In embodiments, the one or more feature vectors are based on the underwater audio signal.

The CNN input layer can receive the feature vectors or a transformed version of the feature vectors. Transforming the feature vectors can increase the accuracy of the machine learning model. In embodiments, the classifying includes transforming the one or more feature vectors. In embodiments, the transforming is based on Mel-frequency cepstral coefficients (MFCCs). The MFCCs can be coefficients within a Mel-frequency cepstrum (MFC). The MFC can be a representation of the power spectrum of the underwater audio signal. In other embodiments, the transforming is based on a fast Fourier transform (FFT). An FFT can convert an analog signal, such as the underwater audio signal, to the frequency domain. In this way, the signal can be decomposed into one or more constituent frequencies. Each constituent frequency can be evaluated for magnitude (power). In other embodiments, the transforming is based on a wavelet transformation. A wavelet transformation can decompose a function into a set of wavelets, which can be frequency components within a signal, such as an underwater audio signal, localized in time. While an FFT can analyze an entire signal, a wavelet transformation can perform localized time-frequency analysis. Additional transformations of the feature vectors are possible before sending to the input layer of the CNN.

The CNN can use a filter at the beginning of processing to detect certain features in the audio input. The filter can be a matrix of numeric weights and/or biases applied to each value in the input layer. For example, the feature vectors can contain several distinct sounds at different frequency ranges, or bands. The filter process, called a convolution operation, can highlight the presence of distinct sounds based on their frequency and voltage ranges within the raw data and can process each sound group separately. Each distinct sound can be represented as a feature map of data that can be used as input for subsequent layers in the neural network.

The example 700 includes hidden layers of neurons within the convolutional neural network. Two hidden layers of neurons are shown, hidden layer 1 730 and hidden layer 2 740. In embodiments, the CNN can have any number of hidden layers, depending on the complexity of the audio signals input into the network. As can be seen in the example diagram, each hidden layer can function as an input layer for subsequent layers of neurons. The raw data input layer inputs data into hidden layer 1. Hidden layer 1 acts as input for hidden layer 2, and so on. Each layer can be more complex than the previous layer, combining features identified in earlier layers to recognize more complex patterns. During the training process, these complex patterns of audio data can be associated with specific sources, including marine mammals or fish, natural occurrences such as earthquakes, manmade activity such as fishing or drilling, and so on. As more training data is collected and entered into the CNN, the machine language model can become better at identifying sources of audio data. The example 700 includes an output layer 750. The output layer can include an identification of a source of audio data received by the hydrophones and analyzed by the machine language model. As more sound data is collected, the source can be associated with animal behaviors such as feeding, breeding, hunting, and so on. The CNN can include an associated probability score with the classification output. The probability score can be high confidence, low confidence, inconclusive, and so on based on the processing of the CNN. Thus, embodiments include generating an associated probability score. In embodiments, the associated probability score predicts an accuracy of the classifying.

Figure 8:
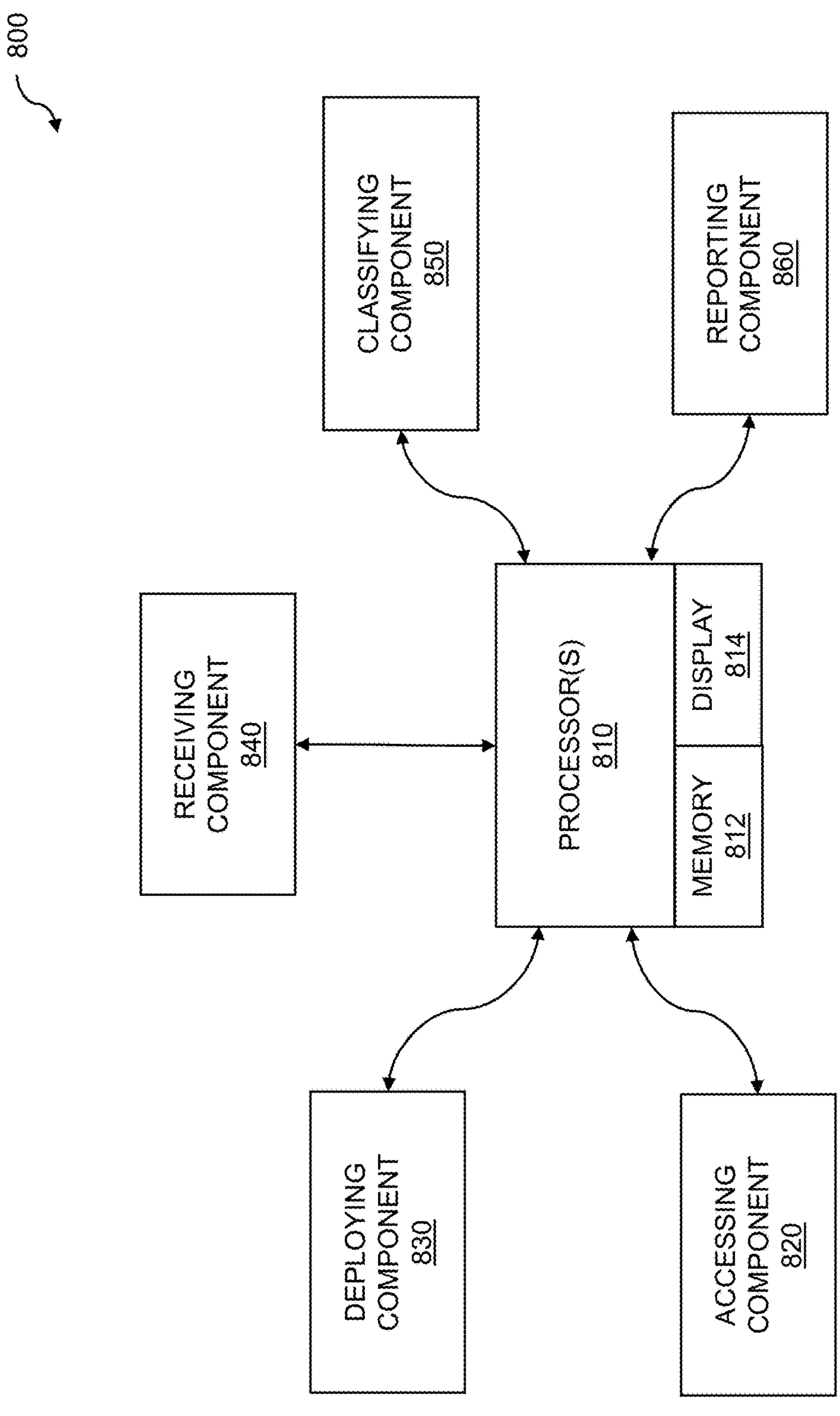
FIG. 8 is a system diagram for automated passive acoustic monitoring with machine learning.

FIG. 8 is a system diagram for automated passive acoustic monitoring with machine learning. The system 800 can include one or more processors 810, which are coupled to a memory 812 which stores instructions. The system 800 can further include a display 814 coupled to the one or more processors for displaying data, intermediate steps, machine learning models, and so on. In embodiments, one or more processors 810 are coupled to the memory 812, wherein the one or more processors, when executing the instructions which are stored, are configured to: access an acoustic sensor, wherein the acoustic sensor includes an embedded acoustic controller, wherein the embedded acoustic controller hosts a machine learning model, and wherein the acoustic sensor is coupled to one or more hydrophones; deploy, in a body of water, the acoustic sensor, wherein the acoustic sensor is submerged; receive, by the one or more hydrophones, an underwater audio signal; classify, by the machine learning model, a predicted source of the underwater audio signal; and report, to a user by the acoustic sensor, the predicted source of the underwater audio signal, wherein the reporting is accomplished using a communications device.

The system 800 includes an accessing component 820. Embodiments include accessing an acoustic sensor. In embodiments, the acoustic sensor includes an embedded acoustic controller. In embodiments, the embedded acoustic controller hosts a machine learning model. The machine learning model can comprise a convolutional neural network (CNN), support vector machine (SVM), K-nearest neighbor (KNN), linear regression, etc. A single embedded acoustic controller can be coupled to more than one hydrophone. In embodiments, the acoustic sensor is coupled to one or more hydrophones. In embodiments, the acoustic sensor includes a plurality of embedded acoustic controllers. In further embodiments, each hydrophone in the one or more hydrophones is coupled to a unique embedded acoustic controller in the plurality of embedded acoustic controllers. Any number of hydrophones can be coupled to any number of embedded acoustic controllers within the acoustic sensor. The acoustic sensor can include a power supply. The power supply can comprise a battery, a rechargeable battery, and so on. The power supply can include a power cable coupled to another power source such as a buoy, an unmanned underwater vehicle (UUV), and so on.

The system 800 includes a deploying component 830. Embodiments include deploying, in a body of water, the acoustic sensor. In embodiments, the acoustic sensor is submerged. The acoustic sensor can be deployed in any body of water such as an ocean, a lake, a river, a pond, an aquarium, and so on. The body of water can include fresh water, salt water, briny water, etc. The sensor can be deployed with a diver; from a surface vessel, a UUV, or a remotely operated underwater vehicle (ROUV); and so on. The hydrophones can collect underwater audio signals for the embedded acoustic controller to process. The deploying can include coupling the acoustic sensor to a buoy. The buoy can be a surface buoy, a drifting buoy, a moored buoy, a spotter buoy, an ice buoy, etc. The buoy can provide power to the acoustic sensor. The deploying can include coupling the acoustic sensor to a stationary surface vehicle to monitor acoustic signals from a specific area such as a coral reef. The acoustic sensor can also be dragged behind a surface or subsurface vehicle to provide monitoring of audio signals sourced over a large area. The acoustic sensor can be mounted in the hull of a such a surface or subsurface vehicle. The acoustic sensor can be integrated with an unmanned underwater vehicle (UUV).

The system 800 includes a receiving component 840. Embodiments include receiving, by the one or more of hydrophones, an underwater audio signal. The signal can originate from marine life such as fish, shrimp, or whales; disturbances at the surface of the water such as rain or lightning; human actions such as boating or fishing; and so on. The hydrophones can detect underwater audio signals produced by one or more audio sources. The signals can be a combination of some or all these factors, and each can vary over time. This can result both in noise and a shifting shape of the underwater audio signals that are received at the sensor. The underwater audio signals can comprise time series analog signals. The hydrophones can convert the underwater audio signals into electrical signals and send them to the embedded acoustic controller for analysis, signal processing, and so on.

The system 800 includes a classifying component 850. Embodiments include classifying, by the machine learning model, a predicted source of the underwater audio signal. The machine learning model can run a neural network, or other supervised deep learning models such as a support vector machine, K-nearest neighbor, linear regression, and so on. In embodiments, the machine learning model comprises a convolutional neural network (CNN). The CNN can include any number of input layers, hidden layers, output layers, and so on. Each layer can include one or more nodes or "neurons". Each node can accept an input, apply a weight or a bias, generate an output, and so on. The classifying can identify a source, which can be a predicted source, of the underwater audio signal. The machine learning model can be based on one or more feature vectors of the underwater audio signal. The feature vectors can be based on any number of aspects of the underwater audio signal. These aspects can include the length of a specific sound, noise levels, signal energy within frequency bands, signal energies within wavelet scales, and so on. The acoustic embedded controller can then transform the one or more feature vectors. The feature vectors (whether transformed or not), can be sent to the machine learning model for classification. The transformations can be based on Mel-frequency cepstral coefficients, a fast Fourier transform, a wavelet transform, or some other transform.

The system 800 includes a reporting component 860. Embodiments include reporting, to a user by the acoustic sensor, the predicted source of the underwater audio signal. The reporting can include more than one predicted source, based on the classifying. As explained above and throughout, the acoustic sensor can be coupled to a buoy. The coupling can include other acoustic sensors, enabling communication between two or more sensors. The coupling can include a wire for power, charging, and/or data communications. The coupling can include wireless communication methods such an acoustic modem, laser, radio transmissions, and so on. The coupling can enable 2-way communication with the buoy and/or other acoustic sensors. The communications can be based on open standards such as Bristlemouth. The buoy can include one or more communications devices. The one or more communications devices can be based on wireless technology, cellular technology such as long term evolution (LTE) broadband wireless or 5G, Bluetooth, satellite communications, or another communications method to send data to a user. The one or more communications devices can use cloud technology to deliver information to the user. The communications device can send data from the acoustic sensor directly to a vessel, UUV, or another aquatic vehicle where a user can be located.

The system 800 can include a computer program product embodied in a non-transitory computer readable medium for monitoring acoustic data, the computer program product comprising code which causes one or more processors to perform operations of: accessing an acoustic sensor, wherein the acoustic sensor includes an embedded acoustic controller, wherein the embedded acoustic controller hosts a machine learning model, and wherein the acoustic sensor is coupled to one or more hydrophones; deploying, in a body of water, the acoustic sensor, wherein the acoustic sensor is submerged; receiving, by the one or more hydrophones, an underwater audio signal; classifying, by the machine learning model, a predicted source of the underwater audio signal; and reporting, to a user by the acoustic sensor, the predicted source of the underwater audio signal, wherein the reporting is accomplished using a communications device.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions-generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for monitoring acoustic data comprising:

accessing an acoustic sensor, wherein the acoustic sensor includes an embedded acoustic controller, wherein the acoustic sensor is coupled to one or more hydrophones;

deploying, in a body of water, the acoustic sensor, wherein the acoustic sensor is submerged;

receiving, by the one or more hydrophones, an underwater audio signal;

classifying, by the embedded acoustic controller, a predicted source of the underwater audio signal;

entering a sleep mode, by the acoustic sensor;

waking, from the sleep mode, the acoustic sensor, wherein the waking is based on an acoustic pressure threshold of the underwater audio signal; and reporting, to a user by the acoustic sensor, the predicted source of the underwater audio signal, wherein the reporting is accomplished using a communications device.

2. The method of claim 1 wherein the classifying is based on filtering, by the embedded acoustic controller, the underwater audio signal for a first frequency band, wherein the first frequency band is associated with a first source of interest.

3. The method of claim 2 wherein the filtering includes a second frequency band, wherein the second frequency band is associated with a second source of interest.

4. The method of claim 3 wherein the underwater audio signal is filtered for the first frequency band and the second frequency band simultaneously.

5. The method of claim 3 wherein the classifying incudes a first classifying, wherein the first classifying is based on the first frequency band, wherein the classifying includes a second classifying, wherein the second classifying includes the second frequency band, and wherein the first classifying and the second classifying occur simultaneously.

6. The method of claim 1 wherein the predicted source comprises a marine mammal.

7. The method of claim 5 wherein the predicted source comprises a species of marine mammal.

8. The method of claim 7 wherein the predicted source further comprises an individual animal within the species of marine mammal.

9. The method of claim 8 wherein the classifying of the underwater audio signal is further accomplished using a convolutional neural network running on the embedded acoustic controller.

10. The method of claim 8 further comprising filtering, by the acoustic embedded controller, the underwater audio signal for a frequency band, wherein the individual animal is associated with the frequency band.

11. The method of claim 7 wherein the classifying is accomplished using one or more feature vectors, wherein the one or more feature vectors are created by the embedded acoustic controller, and wherein the one or more feature vectors are based on the underwater audio signal.

12. The method of claim 11 wherein the classifying includes transforming the one or more feature vectors, wherein the transforming is based on Mel-Frequency Cepstral Coefficients (MFCCs).

13. The method of claim 11 wherein the classifying includes transforming the one or more feature vectors, wherein the transforming is based on a Fast Fourier Transform (FFT).

14. The method of claim 11 wherein the classifying includes transforming the one or more feature vectors, wherein the transforming is based on a wavelet transform.

15. The method of claim 7 further comprising generating an associated probability score, wherein the associated probability score predicts an accuracy of the classifying.

16. The method of claim 15 further comprising alerting a vessel of the species of marine mammal.

17. The method of claim 1 wherein the acoustic sensor includes a plurality of embedded acoustic controllers.

18. The method of claim 17 wherein each hydrophone in the one or more hydrophones is coupled to a unique embedded acoustic controller in the plurality of embedded acoustic controllers.

19. The method of claim 1 further comprising serially coupling at least two hydrophones within the one or more hydrophones, wherein the serially coupling enables one or more customized array configurations.

20. The method of claim 19 wherein the serially coupling includes a daisy chained power over ethernet protocol, and wherein the serially coupling enables distributed beamforming, wherein the distributed beamforming localizes the predicted source.

21. The method of claim 1 wherein the acoustic sensor includes one or more micro-electro-mechanical system (MEMS) sensors, wherein the one or more MEMS sensors measure the acoustic pressure threshold.

22. The method of claim 1 wherein the acoustic sensor is coupled to a buoy.

23. The method of claim 1 wherein the acoustic sensor is integrated with an unmanned underwater vehicle (UUV).

24. The method of claim 9 further comprising training the convolutional neural network, wherein the training is based on one or more underwater audio signals from the individual animal within the species of marine mammal.

25. A computer program product embodied in a non-transitory computer readable medium for monitoring acoustic data, the computer program product comprising code which causes one or more processors to perform operations of:

accessing an acoustic sensor, wherein the acoustic sensor includes an embedded acoustic controller, wherein the acoustic sensor is coupled to one or more hydrophones;

deploying, in a body of water, the acoustic sensor, wherein the acoustic sensor is submerged;

receiving, by the one or more hydrophones, an underwater audio signal;

classifying, by the embedded acoustic controller, a predicted source of the underwater audio signal;

entering a sleep mode, by the acoustic sensor;

waking, from the sleep mode, the acoustic sensor, wherein the waking is based on an acoustic pressure threshold of the underwater audio signal; and reporting, to a user by the acoustic sensor, the predicted source of the underwater audio signal, wherein the reporting is accomplished using a communications device.

26. A computer system for monitoring acoustic data, comprising:

a memory which stores instructions;

one or more processors coupled to the memory wherein the one or more processors, when executing the instructions which are stored, are configured to:

access an acoustic sensor, wherein the acoustic sensor includes an embedded acoustic controller, wherein the acoustic sensor is coupled to one or more hydrophones;

deploy, in a body of water, the acoustic sensor, wherein the acoustic sensor is submerged;

receive, by the one or more hydrophones, an underwater audio signal;

classify, by the embedded acoustic controller, a predicted source of the underwater audio signal;

enter a sleep mode, by the acoustic sensor;

wake, from the sleep mode, the acoustic sensor, wherein waking is based on an acoustic pressure threshold of the underwater audio signal; and report, to a user by the acoustic sensor, the predicted source of the underwater audio signal, wherein the reporting is accomplished using a communications device.

* * * * *